United States Patent [19]

Fazio

[11] Patent Number: 5,082,707
[45] Date of Patent: Jan. 21, 1992

[54] DISPOSABLE BEACH TOWEL

[76] Inventor: Michele P. Fazio, 12 Eastwood Ave., Utica, N.Y. 13501

[21] Appl. No.: 476,820

[22] Filed: Feb. 7, 1990

[51] Int. Cl.$^5$ .............................................. B32B 3/10
[52] U.S. Cl. ...................... 428/43; 428/537.5; 428/906
[58] Field of Search ............... 428/153, 43, 906, 537.5

[56] References Cited

U.S. PATENT DOCUMENTS

| | | | |
|---|---|---|---|
| 2,284,944 | 6/1942 | Bruning | 428/153 X |
| 3,653,927 | 4/1972 | Howell et al. | 428/153 X |
| 3,678,933 | 7/1972 | Moore et al. | 428/336 X |
| 3,862,876 | 1/1975 | Graves | 428/83 X |
| 3,892,310 | 7/1975 | Welin-Berger | 428/906 X |
| 3,916,447 | 11/1975 | Thompson | 428/284 X |
| 4,043,062 | 8/1977 | Lehrman | 428/102 X |
| 4,195,378 | 4/1980 | Parker | 428/100 X |
| 4,278,719 | 7/1981 | Sarnecki | 428/81 X |
| 4,328,275 | 5/1982 | Vargo | 428/156 |
| 4,457,964 | 7/1984 | Kaminstein | 428/153 X |
| 4,500,585 | 2/1985 | Erickson | 428/152 |
| 4,579,762 | 4/1986 | Ucci | 428/97 X |
| 4,654,906 | 4/1987 | Roberts | 428/81 X |

Primary Examiner—Henry F. Epstein
Attorney, Agent, or Firm—Schmeiser, Morelle & Watts

[57] ABSTRACT

A disposable towel is described which employs a top layer of absorbent material and a bottom layer of water impermeable material. The towel is sized similar to a beach towel and can include pockets which can receive sand or personal articles. In the preferred embodiment, the material layers are made of paper and the bottom layer has a water proofing substance applied to its exterior surface. The towel of the instant invention can be stored in a waterproof container or be supplied in a multi-towel roll form.

12 Claims, 2 Drawing Sheets

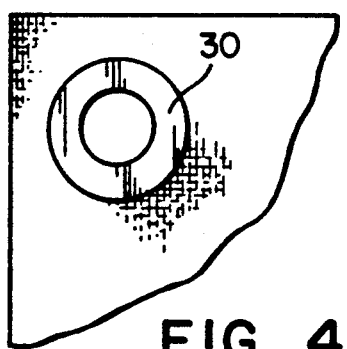
FIG. 4
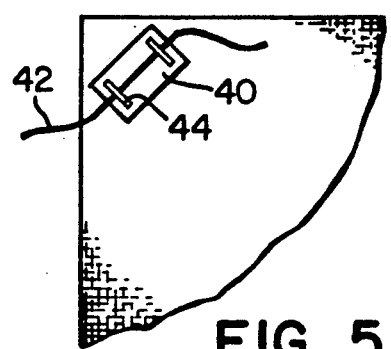
FIG. 5
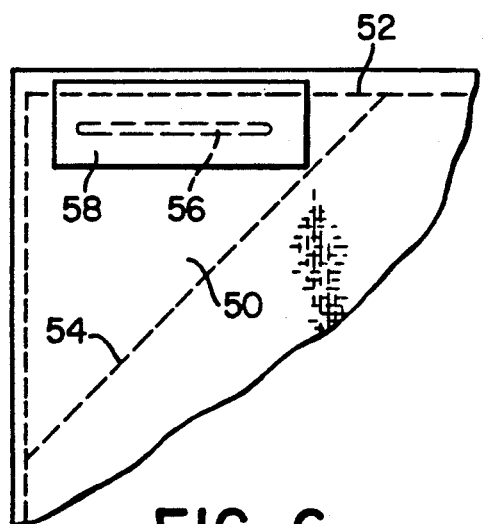
FIG. 6
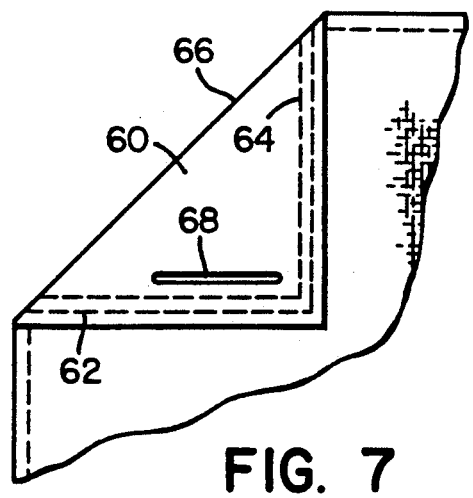
FIG. 7
FIG. 8
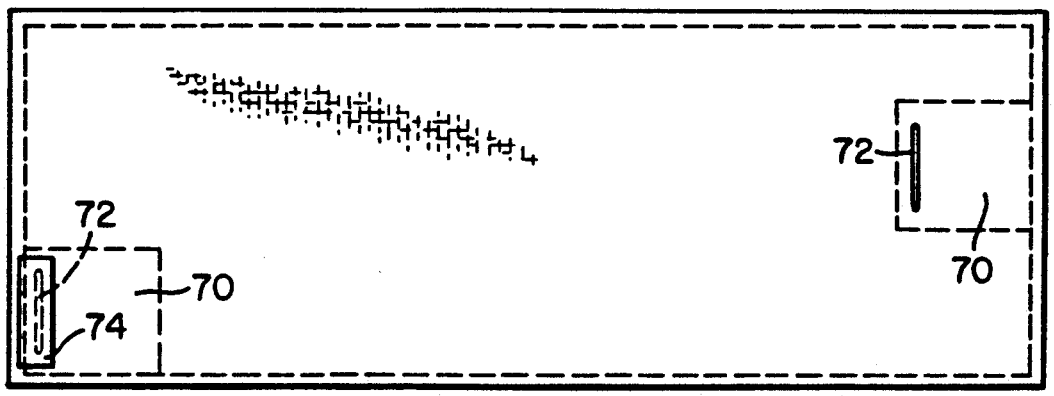

DISPOSABLE BEACH TOWEL

FIELD OF THE INVENTION

The instant invention is in the field of drying aids and more specifically, in the field of disposable towels. The towel of the instant invention is of a size similar to a bath towel and is multi-layered with at least one water absorbent top layer and a water impermeable bottom layer.

BACKGROUND OF THE INVENTION

Towels are available in all shapes and sizes. Traditionally, small towels up to the size of a hand-towel (approximately 12 inches×12 inches) have been made both from reusable and disposable materials. Larger towels have been made solely from reusable cloth-type materials due to the large amount of material required.

Large towels, approximately 3 feet by 4 feet, are used in a vast number of different situations. In the home, they are used after a bath or shower and, in rare instances, they are used to mop up large spills. Normally, washing towels does not cause an undue burden. However, when a homeowner has a pool, the number of towels to be washed increases dramatically. Both family members and guests will often require additional towels to dry off after going swimming. In fact, overnight guests can often double one's towel washing requirements. Therefore, there are a large number of instances when the washing of towels becomes an onerous task to the homeowner.

Towels are a common beach accessory. Not only are they used to dry oneself off after bathing, they are commonly used as a mat for laying on the beach. By the end of a beach outing, one's towels are often full of sand and still damp. When they are then placed in the car, they can dampen the car's interior carpeting and at the same time, deposit a significant amount of sand into the carpeting. Once home, carrying the towels into the house can again cause the unwanted depositing of sand in carpeting. Later washing of the towels can possibly cause damage to the washing machine due to sand deposition in the machine's outlet valve or pump.

It is an object of the instant invention to provide a towel that is both disposable and low in cost. This will allow a person to possess a large number of spare towels that, once used, can be thrown away instead of requiring cleaning.

Another object of the instant invention is to provide a towel suitable for beach use that can be thrown away in lieu of carried home.

SUMMARY OF THE INVENTION

The invention is a multi-ply disposable towel. It comprises at least two layers with a bottom layer being water impermeable and at least one top layer being water absorbent (hygroscopic). Preferably, the layers are made of a paper-like material and the bottom layer is treated with or made from a water resistant substance.

The towel of the invention has similar dimensions to that of a bath towel and would have a minimum width of 24 inches. It can also be produced in a larger size to enhance its use as a beach towel or beach blanket. In its most basic embodiment, the invention is a two ply paper towel in which one of the plies has been sprayed with a water resistant coating such as SCOTCHGUARD. In this way, the face ply would still retain its paper towel-like absorbency and high resistance to tearing. The rear or bottom ply would still be tear resistant and could possibly still absorb some liquid. However, the external surface of the bottom ply would be water impermeable. In this way, use of the towel would not affect the qualities of the external surface of the bottom ply. Therefore, sand would not stick to this surface as it does to an ordinary fabric towel which has been dampened. Also, the towel could be placed on a damp surface without its top layer becoming wet.

Additional embodiments are also noted which are based on the primary embodiment described above.

Additional layers of hygroscopic material can be added to the basic towel. In this way, a user can separate a top absorbent layer from the towel, use it for toweling off water, then throw away the dampened layer. The user could then lay down on the remaining towel which would still be dry.

A disposable towel according to the invention can be folded into a compact space and packaged within a waterproof container. In this manner, a user could easily own a large number of disposable towels for later use. These towels could then be offered to house guests or kept by the pool. Spare towels could even be carried in a car trunk in a compact manner without mildew considerations.

Additional modifications can be made to the basic embodiment to further adapt and enhance its usefulness for beach goers. Its four corners can include pockets into which sand or weighty materials can be placed. Each corner can have a precut, reinforced hole through which a stake can be placed. In addition, the corners can have strings which extend from the corners and with which the corners can be tied to stakes or other free standing fixing structures. The strings can be affixed to the towel by, for example, gluing or stapling.

As already noted, the bottom layer is substantially impermeable to liquid passage. A slightly more expensive version of the towel could have a GORE-TEX type water resistant coating applied which would allow some breathability of the towel without causing the sand adhesion and surface liquid absorbing problems noted with prior-art towels.

In the preferred embodiment, the entire towel is made from at least two layers of paper material with the bottom layer treated to prevent liquid permeability. In an additional embodiment, the bottom layer can be made from a SPACE BLANKET type of metalized material which is known to reflect a great percentage of a user's body heat. In this way, the towel can be used both as a towel and as a highly efficient, compact blanket. As an alternate, the bottom layer can be made from a plastic material.

The instant invention can also be modified to include an additional pocket or pockets into which a user can place personal items such as sun-tan lotion, sunglasses, keys, or articles of clothing. The pocket can be formed in any of a number of methods including sewing the layers together in a pocket shape. This would be in addition to the normal affixing of the layers which is accomplished by gluing stitching. The pocket would have a slit in its top portion to allow entry and, optionally, a cover can be added over the slit. Another method of adding pockets to the instant invention is by placing a premade pocket onto the towel's top layer and securing it by glue or stitches. An additional method involves bending over a corner of the blanket and affixing it fully on one side and partially on another. This would result in a triangular pocket with entry provided by the partially open side.

One additional method of supplying towels according to the instant invention would be to provide the towel material in roll form and placing perforations across the width of the material so that a single towel can be removed from the roll. In this way, a single roll having 20 separable towels can be purchased and stored by a pool. The roll can be placed near the pool and in this way, conveniently supply towels at the point of use.

BRIEF DESCRIPTION OF THE DRAWINGS

FIG. 4 shows one embodiment of a corner having a reinforced hole.

FIG. 5 shows another embodiment of a corner having a string attached.

FIG. 6 details another embodiment of a corner in which a weight receiving pocket is pictured.

FIG. 7 shows another embodiment in which a corner is folded over to form an article or weight receiving pocket.

FIG. 8 details the instant invention including a pair of article receiving pockets.

DETAILED DESCRIPTION OF THE INVENTION

Figure 1:
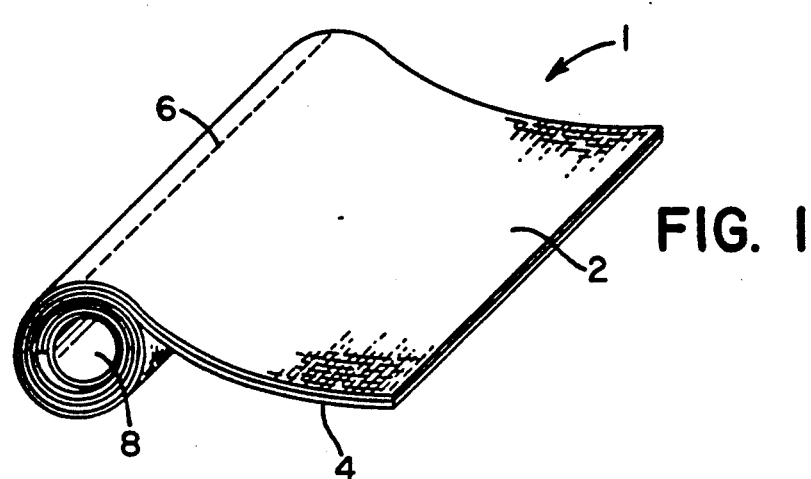
FIG. 1 shows a roll of disposable towels of the instant invention.

The invention is depicted in roll form in FIG. 1. The disposable towel is made from two layers of paper toweling affixed to each other by adhesive or stitching. The top layer 2 is a porous paper material that is hygroscopic and has a high wet strength. High wet strength describes the characteristic whereby when the material becomes wet, it maintains its shape and form. This is unlike other paper products such as toilet paper and diapers where once the material becomes wet, it disintegrates and gathers into piles. A material that meets the required characteristics would be similar to the toweling used for the WypAll brand of disposal shop towels, sold by the Scott Co., Phil., PA.

The bottom layer 4 is shown as being identical in structure and size to the top layer. It is also made of paper that is absorbent and has a high wet strength. However, the bottom layer has a substance applied to its exterior surface that makes it substantially impermeable to water. As described previously, this substance can be similar to SCOTCHGUARD or GORE-TEX. There are other well known functionally similar materials which would be equally suitable. These would include spray waxes and sprayed Teflon, all of which are similar in performance and method of application.

FIG. 1 also shows a plurality of perforations 6 that have been made in the towel material as it was originally being wound onto the core 8. These perforations allow a user to unroll a towel of a predetermined length from the roll and then to easily separate the towel from the towel material remaining on the roll.

As an alternate embodiment (not shown) the bottom layer of the towel can be made from a different material. For example, it can be made from a metalized material, such as that used for the SPACE BLANKET type of emergency blanket. This alternate embodiment would allow the device to be used as a towel for drying and also as a blanket for warmth. As another example the bottom layer can be made from a plastic material.

Figure 2:
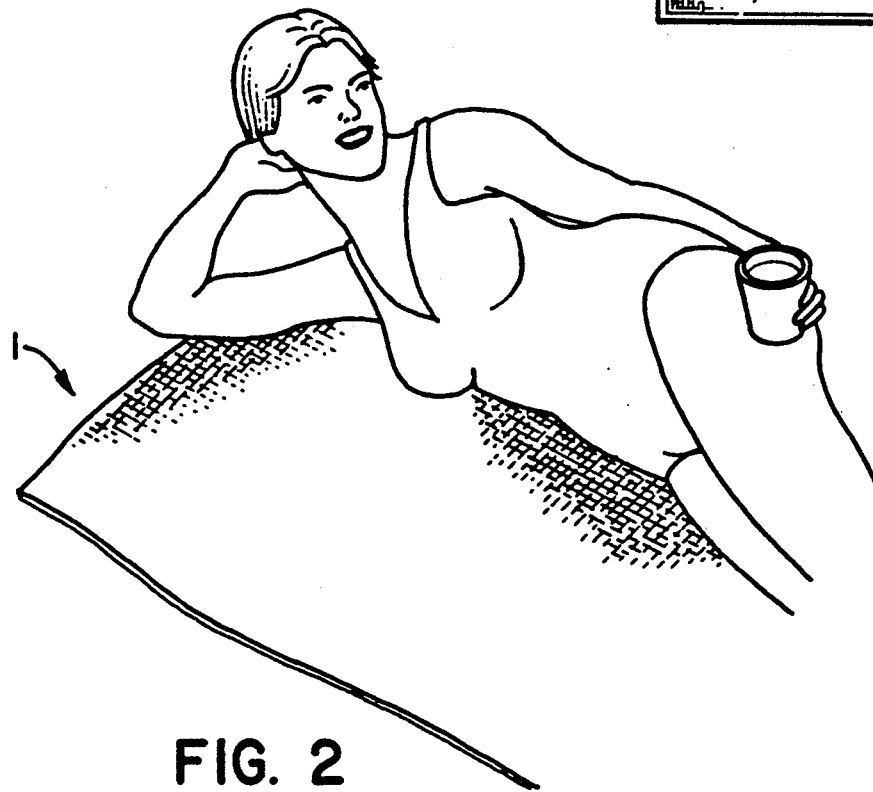
FIG. 2 shows the invention in use as a mat.

FIG. 2 shows the towel 1 in use as a mat. The top absorbent layer absorbs sweat and is comfortable to lay upon. The exterior surface of the bottom layer does not become damp and thereby adherence of sand or other debris is avoided. Another major advantage of the water impermeable exterior of the bottom layer is that the towel can be placed upon a wet or damp surface and the user can then lay upon the towel without getting wet. This is especially advantageous with pool use or as a groundcloth for camping or picnics.

Figure 3:
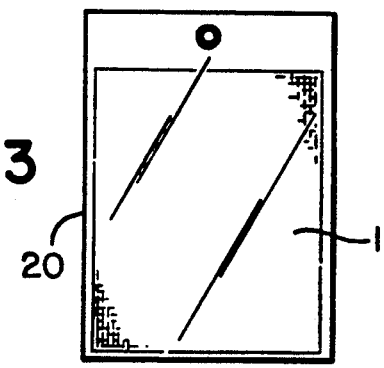
FIG. 3 shows a disposable towel in a package.

FIG. 3 shows the towel of the invention folded up and retained within a waterproof container 20. The container is designed to hold 1 or 2 towels and is used to store the towel in a dry condition until needed. The container can be easily stored in a drawer or car trunk for later use. When in a car, one would not have the worry about mildewing or soiling of the towel as one ordinarily would with a fabric towel. In this way, one can always carry a towel in the car and be able to go swimming, picnicking, etc. with only a minimum of preparation.

FIGS. 4-7 show four different adaptations that employ at least one corner of the basic rectangular towel of the invention.

FIG. 4 shows a corner of the towel to which a circular reinforcement 30 has been added. The reinforcement is glued or stitched in place and is made from either paper, plastic or metal. The center of the reinforcement includes a hole through which a stake can be placed to hold the towel in place when used out-of-doors. Alternately, a string can be placed through the hole and the towel can be tied to a free standing pole or stake.

FIG. 5 shows another form of corner modification for securing the towel in place. A reinforcement 40 of any shape is affixed to the towel by gluing or stitching. A string 42 is then stapled to the reinforcement and towel by staples 24 which prevent sliding or removal of the string. It should be noted that use of a reinforcement is preferred but is not required. The string may be stapled directly to the towel material.

FIG. 6 shows a corner of the towel that has been modified to include a pocket 50. The pocket can receive either sand, rocks, articles of clothing or personal items. Placing one of the above weights in the pocket functions to secure the towel in place on a windy day. As shown, the outer paper layer is affixed to the lower layer by stitches 52. Glue or other similar means can be used. In addition to the outer stitching, an inner line of stitches 54 have been added to form pocket or cavity 50. A slit 56 is made in the outer/top paper layer to provide an entryway into the pocket. Also shown is an optional flap 58 which can cover the slit and thereby prevent inadvertent spillage of the pocket's contents.

FIG. 7 details another embodiment of a corner pocket. In this figure, a corner of the basic rectangular towel has been folded over to form a pocket 60. As normally done, the layers of the towel are affixed to each other by stitches 62. In this embodiment, once the corner has been folded over, a second pattern of stitches 64 is added which secures the corner in its folded over condition and forms a cavity between the corner and upper surface of the towel. The cavity is triangular in shape and the folded edge 66 of the towel forms one side of the cavity while the lines of stitches 64 form the other two sides. A slit 68 is made through the top of the cavity to provide an entry thereto.

FIG. 8 shows a plurality of storage pockets 70 formed in the towel by stitching or gluing of one layer to another layer similar to the pocket shown in FIG. 6. Each pocket has an access slit 72. The pockets can be used to store keys, shoes, articles of attire or other objects which one normally wishes to remain sand free and secured in place. The pockets may include flaps 74 which conceal the entry slits. One pocket is shown having a flap.

It is also noted that the pockets shown in FIGS. 6 and 8 may be prefabricated from paper or other materials and the pockets then affixed by stitching, gluing, snaps, etc. to the towel.

Another embodiment of the basic towel is one in which one or more layers of absorbent paper are removably affixed to the back impermeable paper layer. These layer(s) are affixed in the manners previously noted for affixing layers of paper. However, the additional layers are affixed in a manner whereby the additional layers may be quickly and easily disassociated from the underlying layers. This may be accomplished by stitching or gluing the removable layers to the underlying layers only at their corners. In this way, the layers can be easily separated. Another method is to provide perforations along the joining sections of the layers. A user can then separate the inner portion of an outer layer from the under layer by pulling the outer layer and tearing it along the preforations from its outer edge and thereby from the bottom layer(s). The purpose of this is to provide a means whereby one towel can be used for a number of different drying applications, i.e. an outer layer can be removed from the towel, used to dry oneself off, then disposed of. The remaining towel, if more than two layers of paper were used, can be used again later for an additional one or more drying applications. At a minimum, after all the upper layers have been removed, the bottom layer can be used at a mat.

Finally, it is pointed out that since the towel is made from paper or a paper-like material, the exterior surface can readily be printed upon. A towel can include a logo or advertising on its top layer printed with a water proof ink. In this way, due to its basic inexpensive nature, the towel can be given away as a complimentary product.

The embodiments disclosed herein have been discussed for the purposes of familiarizing the reader with the novel aspects of the invention. Although preferred embodiments of the invention have been shown and described, many changes, modifications and substitutions may be made by one having ordinary skill in the art without necessarily departing from the spirit and scope of the invention.

I claim:

1. A disposable beach towel comprising:
   a first layer of porous water absorbent material that has a high wet strength and having a width of at least 24 inches and a length of at least 48 inches; and
   a second layer of porous water absorbent material affixed to said first layer of material and of substantially the same size wherein an exterior surface of said second layer of material has been treated with a waterproofing material that has been at least partially absorbed into said second layer of material thereby providing the second layer of material with the ability to prevent any passage of water therethrough.

2. The towel of claim 1 wherein said layers are affixed in a manner that allows a user to easily separate the two layers.

3. The towel of claim 1 wherein said towel is substantially rectangular having 4 corners and said corners are adapted to include pockets for receiving a weight means whereby said pockets after receiving a weight means function to prevent wind from moving said towel when said towel is placed on an outdoor surface.

4. The towel of claim 1 wherein said corners are adapted to receive a securing means.

5. The towel of claim 1 wherein said waterproofing material is a plastic polymeric material.

6. The towel of claim 1 also comprising at least one additional water absorbent layer of material substantially identical to said first layer and affixed atop said first layer and easily removable therefrom.

7. The towel of claim 1 also comprising at least one pocket for securably receiving a user's personal articles or clothing.

8. The towel of claim 1 wherein said first and second layers of material are made of the same type of paper and are substantially equal in thickness.

9. The towel of claim 8 also comprising:
   a plurality of securing means located proximate the perimeter of said towel adapted to secure said towel in place and thereby prevent said towel from inadvertent movement.

10. The towel of claim 8 also comprising at least one storage pocket whereby a user can store a possession within said pocket.

11. A disposable beach towel unit comprising:
   a towel having a first layer of porous water absorbent paper material that has a high wet strength and has a size at least equal to that of a bath towel;
   a second layer of porous water absorbent paper material affixed to a bottom surface of said first layer of paper material, said second layer having a top surface capable of absorbing water and a bottom exterior surface treated with a substance that makes it water impermeable and wherein said second layer is substantially identical in dimensions to said first layer;
   a plurality of pockets located proximate the perimeter of said towel, said pockets having a size and shape whereby the pockets are capable of releasably holding a quantity of sand for securing in place said towel; and
   a holder means for containing said towel in a folded form.

12. A roll of disposable beach towels comprising:
   a roll of material, said material having a top and a bottom layer;
   said top layer being of a porous water absorbent material that has a high wet strength;
   said bottom layer being of a porous water absorbent material affixed to said top layer of material and of substantially the same size and thickness wherein a bottom surface of said bottom layer of material has been treated with a waterproofing material that has been at least partially absorbed into said bottom layer of material thereby providing the bottom layer of material with the ability to prevent any passage of water therethrough;
   said roll having a width of at least 24 inches and said material having a length of at least 96 inches; and
   a series of perforations extending across the width of said material and located at predetermined lengths of the material so that a user can unroll a towel length piece of material from said roll and separate the piece from the roll by ripping the material along the perforations thereby providing the user with a towel length piece of material that has a bottom exterior surface that is impermeable to water.

* * * * *